Figure 1:
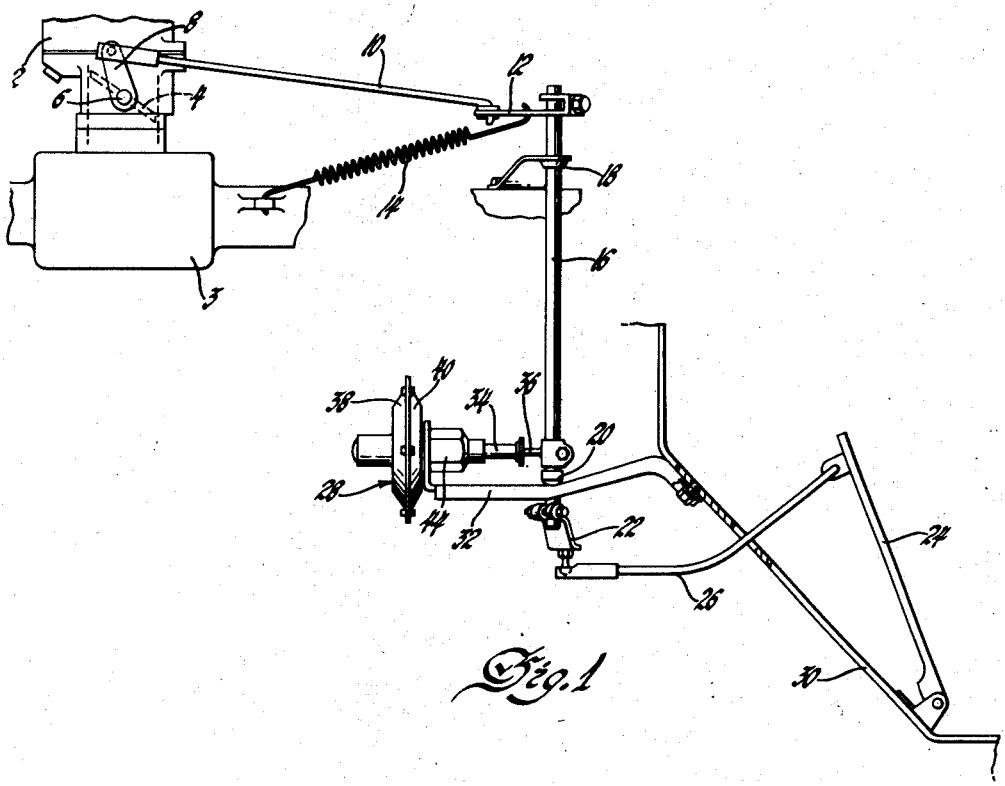

Oct. 27, 1953

A. F. BRAUN 2,657,037

ANTISTALL DEVICE

Filed Jan. 12, 1950

Inventor
Adolph F. Braun
By
Willis, Helwig & Baillio
Attorneys

Patented Oct. 27, 1953

2,657,037

UNITED STATES PATENT OFFICE 2,657,037

ANTISTALL DEVICE

Adolph F. Braun, Davison, Mich., assignor to General Motors Corporation, Detroit, Mich., a corporation of Delaware Application January 12, 1950, Serial No. 138,213

4 Claims. (Cl. 267—1)

The present invention relates to means for preventing the stalling of gasoline engines and more particularly relates to means for arresting the final closing movement of an engine throttle valve to prevent said stalling.

The stalling of automobile vehicle engines has long been a problem particularly serious to drivers in traffic congested areas. During normal operation of the engine, condensed fuel collects on the inner surface of the manifold. When the throttle is suddenly closed, the pressure within the manifold decreases rapidly thus causing the almost immediate vaporization of this fuel to thereby enrich the fuel mixture. This vaporization of the fuel together with the decrease in air supply, creates an air fuel mixture which is far too rich to burn properly.

During the interval when the fuel does not burn, the engine misfires, does not produce power and may stall. The rotary inertia mass of modern automotive crankshaft and flywheel assemblies is quite low thereby making the period through which the engine will coast very short. With the introduction of fluid flywheels and torque converters, this "coast interval" has been decreased still further due to the drag of the impeller. In torque converter transmissions, this condition is still further aggravated by the fact that but little torque may be transmitted from the turbine member to the impeller member to drive the engine during overrunning conditions. Due to this low rotating inertia mass and the drag caused by the fluid coupling or torque converter, the engine is frequently unable to coast through the interval where its combustion chamber is receiving incombustible gases and thereby stalls. This has become a serious problem especially with automotive vehicles which are driven under heavy traffic conditions.

One of the solutions of this problem is to decrease the rate of pressure change within the intake manifold so as to cause a slower vaporization of the condensed fuel and thus prevent the introduction of the extremely rich fuel mixture into the engine combustion chamber. Previous workers in the field have endeavored to decrease this rate of pressure change by the utilization of intake manifold vacuum responsive devices for controlling the final closing of the throttle valve. Such devices are quite expensive. Other prior workers in the field have utilized liquid dashpots. These liquid dashpots are fairly expensive and require modification of the carburetor if the fuel is to be used as a liquid damping agent. There are other disadvantages to liquid dashpots resulting from the necessity for sealing and using fairly close dimensional tolerances.

It is therefore an object of the present invention to produce an air dashpot for controlling the final closing rate of a vehicle engine throttle so as to prevent stalling.

It is a further object of the present invention to produce an air dashpot offering resistance to throttle movement in one direction and automatically returnable to a preset position.

It is a further object of the present invention to produce an air dashpot utilizing a spring urged diaphragm and a check valve to give unidirectional resistance to movement.

It is a further object of the present invention to produce an air dashpot having a plunger which engages a portion of the throttle valve linkage to thereby control the rate of final closure of the throttle valve.

Other objects of this invention will become apparent upon reading the specification and inspection of the drawing and will be particularly pointed out in the claims.

Referring to the figures in the drawing, Figure 1 is a general arrangement drawing showing a throttle valve linkage incorporating the present invention.

Figure 2:
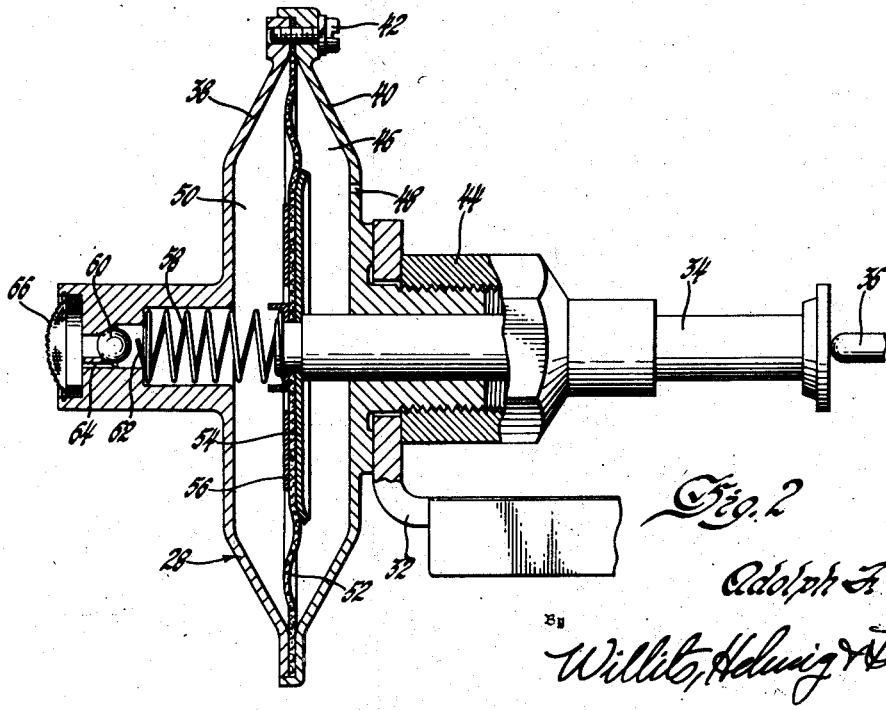

Figure 2 is a cross-sectional view of the air dashpot used in the present invention.

Referring now more particularly to Figure 1, 2 is a conventional carburetor having a throttle valve 4 rotatable with a shaft 6 by means of lever arm 8. The crank 8 is actuated by an arm 10 connected to a second crank 12. The spring 14, also connected to crank 12, urges the throttle valve to the closed position. The arm 12 is rigidly connected to the rotatable shaft 16 which is mounted to the vehicle by means of brackets 18 and 20. The shaft 16 is actuated by crank 22 which is connected to accelerator pedal 24 by means of rod 26. The depression of the accelerator pedal 24 causes the throttle closing bias exerted by spring 14 to be overcome and the throttle 4 opened. The dashpot mechanism 28 is rigidly mounted to the framework of the vehicle 30 by means of bracket 32. This dashpot has a reciprocal plunger 34 which engages an arm 36 which is rigidly attached to the shaft 16. The final closing movement of the throttle is thereby retarded. Means is provided for adjusting the angular position of the arm 36 on the shaft 16 so as to cause the engagement of this arm and the reciprocal plunger 34 at the proper position to give the desired dashpot action.

It may thus be seen that as the accelerator pedal 24 is released, the spring 14 urges the throttle valve 4 towards its closed position. At the proper position during closing, the arm 36 engages the dashpot plunger 34 so as to arrest the final closing of the throttle 4. This control of throttle closing rate also controls the rate of pressure change in the manifold to prevent an incombustible mixture of fuel from being introduced into the combustion chamber.

Referring more particularly to Figure 2, the construction of the air dashpot is illustrated in detail. The casing of the dashpot consists of members 38 and 40 which are secured together by means of screws 42. The casing member 40 and hence the entire dashpot is rigidly secured to the framework of the vehicle by means of bracket arm 32 and member 44 which latter member acts both as a securing nut and a guide for the plunger 34. One of the chambers 46 in the casing exhausts to atmosphere through opening 48. It is therefore not necessary for the plunger 34 to have any fluid seal. The other chamber 50 of this dashpot is separated from the chamber 46 by means of flexible diaphragm 52. The diaphragm 52 is rigidly secured to the plunger 34 by means of metallic plates 54 and 56. The plunger 34 is biased, to the right as shown in the drawing, by means of compression spring 58 to thereby maintain contact of the plunger 34 with the arm 36 during the plunger's limit of travel. The ingress and egress of air to and from this chamber is controlled by a ball type check valve 60 in which the ball is maintained in place by a member 62 and the valve is by-passed by restricted opening 64. A filter or screen 66 prevents the introduction of dirt into the dashpot during its normal operation. Due to the action of the check valve 60, a minimum of restriction is imposed upon air entering the chamber 50 but the exhaust of this air from the chamber is restricted by the opening 64 to give the desired dashpot action.

Operation

It is readily apparent from the inspection of the drawing and the explanation of the device in the description above that upon depression of the throttle accelerator pedal 24, the throttle 4 is opened against the bias of the spring 14 and the plunger 34 under the action of the spring 58 follows the movement of the arm 36. The movement of the plunger 34 to the right may be quite rapid since the ball check valve 60 is unseated and allows the rapid entrance of air into the chamber 50. The movement of the plunger 34 is arrested when the member 54 engages the side of the casing member 40 and the arm 36 on further movement then ceases to engage the plunger 34. These two members are not in engagement under normal throttle opening. Upon release of the accelerator pedal 24, the spring 14 rapidly closes the throttle 4 until the member 36 engages the plunger 34. At this point, the force exerted by the tension spring 14 being greater than that exerted by the compression spring 58, the plunger 34 starts moving to the left. This movement is retarded and its return limited by the rate of air exhaust through the by-pass opening 64 since the ball check valve is then seated. In this way the final closing movement of the throttle is retarded and its rate of closure so limited that the rate of pressure decrease within the manifold 3 is not sufficiently high to cause the formation of an unburnably rich fuel mixture by the sudden vaporization of the condensed fuel on the inner surface of this manifold 3. By thus retarding the final closing movement of the throttle, misfiring of the engine is prevented and thus the engine does not have an interval of no power production allowing it to stall.

It may thus be seen that this invention prevents the stalling of a vehicle engine in the environment described above.

It is to be understood also that although the invention has been described with specific reference to a particular embodiment thereof, it is not to be so limited, since changes and alterations therein may be made which are within the full intended scope of this invention as defined by the appended claims.

I claim:

1. An air dashpot including: an air chamber having a flexible diaphragm wall the movement of which varies the volume of said chamber, a check valve in another wall of said chamber allowing the free movement of air into said chamber from the atmosphere but restricting its exit therefrom, a restricted opening in said other wall by-passing said check valve, a compression spring positioned between said check valve and said diaphragm and acting between said other wall having the check valve and said diaphragm to bias said flexible diaphragm wall in a direction to increase the volume of said chamber, and means for moving said diaphragm against said biasing spring to decrease the volume of said chamber and force the air in said chamber through said restricted opening to provide a dashpot action.

2. An air dashpot including: a hollow casing, a diaphragm separating the interior of said casing into two chambers, a plunger capable of reciprocal movement through one wall of said casing and attached to said diaphragm, an opening in one wall of said casing for allowing the free passage of air between one of said chambers and the atmosphere, a one-way valve in another wall of said casing capable of allowing the free entrance of air from the atmosphere into the other of said chambers but preventing its exhaust to the atmosphere, a restricted opening by-passing said one-way valve, a biasing means positioned between said valve and said diaphragm urging said diaphragm and plunger in the direction to exhaust the air from the first of said chambers, means for engaging said plunger to force its reciprocal movement against said biasing means to force the air in said other of the chambers through the restricted opening and thereby provide a dashpot action.

3. An air dashpot including: a hollow casing, a flexible diaphragm separating the interior of said casing into two chambers, a plunger capable of reciprocal movement through one wall of said casing, means for attaching one end of said plunger to said diaphragm, an opening in one wall of said casing at a substantial distance from said plunger for allowing the free passage of air between one of said chambers and the atmosphere, a ball check valve in another wall of said casing capable of allowing the free entrance of air from the atmosphere into the other of said chambers but preventing its exhaust to the atmosphere, a restricted opening by-passing said check valve, a biasing means positioned between said check valve and said diaphragm urging said diaphragm and plunger in the direction to exhaust the air from the first of said chambers, and means for engaging said plunger to force its reciprocal movement against said biasing means to force the air in said other of the chambers through the restricted opening to provide a dashpot action.

4. A fluid dashpot including a hollow casing, a diaphragm separating said casing into two chambers, a member attached to said diaphragm and extending through one wall of said casing, an opening in said wall of said casing at a distance from said member for allowing the free ingress and egress of fluid from one of said chambers, a one-way valve in another wall of said casing capable of allowing the free ingress of fluid into the other of said chambers but preventing its egress, a restricted opening by-passing said one-way valve, a biasing means positioned between said member and said casing urging said member in an outward direction through the first mentioned wall of said casing, and means for overpowering said biasing means to force the fluid from said second chamber through said restricted opening to provide a dashpot action.

ADOLPH F. BRAUN.

References Cited in the file of this patent

UNITED STATES PATENTS

| Number | Name | Date |
|---|---|---|
| 431,387 | McHugh | July 1, 1890 |
| 844,800 | Hewlett et al. | Feb. 19, 1907 |
| 1,995,721 | Sanford | Mar. 26, 1935 |
| 2,033,396 | Perrine | Mar. 10, 1936 |
| 2,306,877 | Gould | Dec. 29, 1942 |
| 2,387,066 | Harding | Oct. 16, 1945 |
| 2,416,070 | Shively | Feb. 18, 1947 |

FOREIGN PATENTS

| Number | Country | Date |
|---|---|---|
| 315,879 | Italy | Mar. 10, 1934 |